Figure 1:
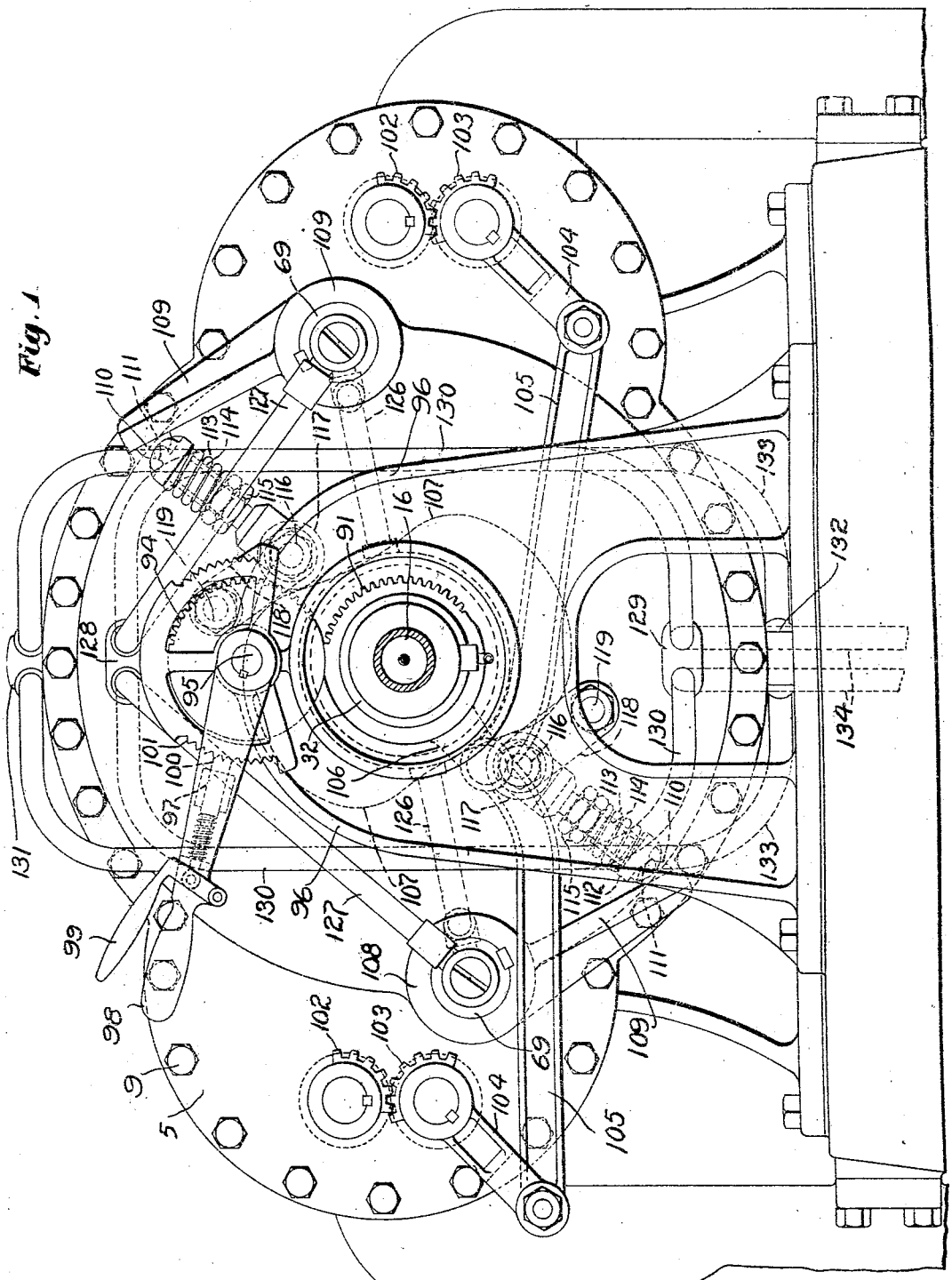

W. N. MEARS.
ROTARY ENGINE.
APPLICATION FILED MAR. 10, 1908.

1,145,161.

Patented July 6, 1915.
7 SHEETS—SHEET 1.

Witnesses:
Edwin F. Luck
Irving W. Townsend

Inventor:
William Nichols Mears
by Emery and Booth
Att'ys.

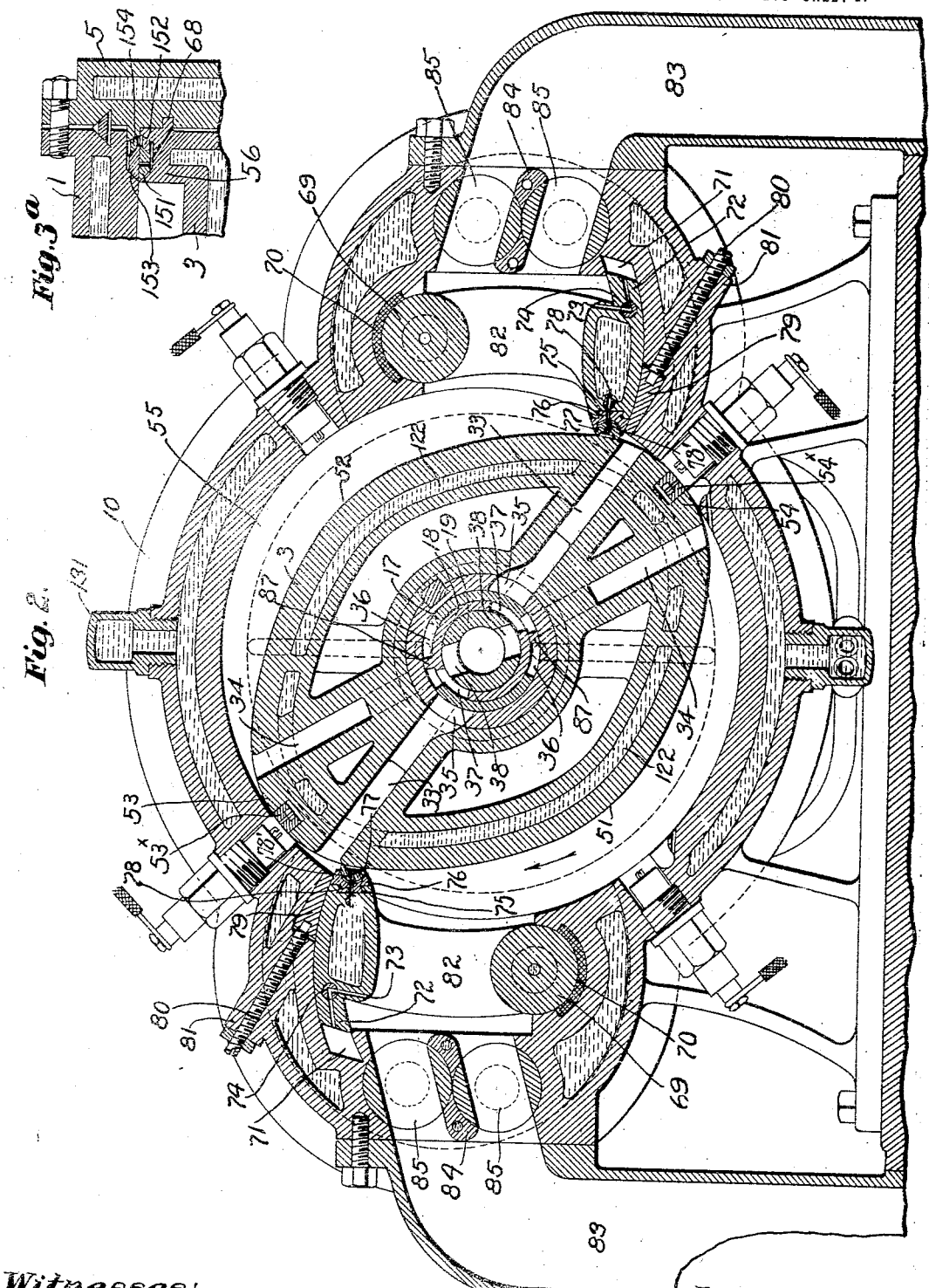

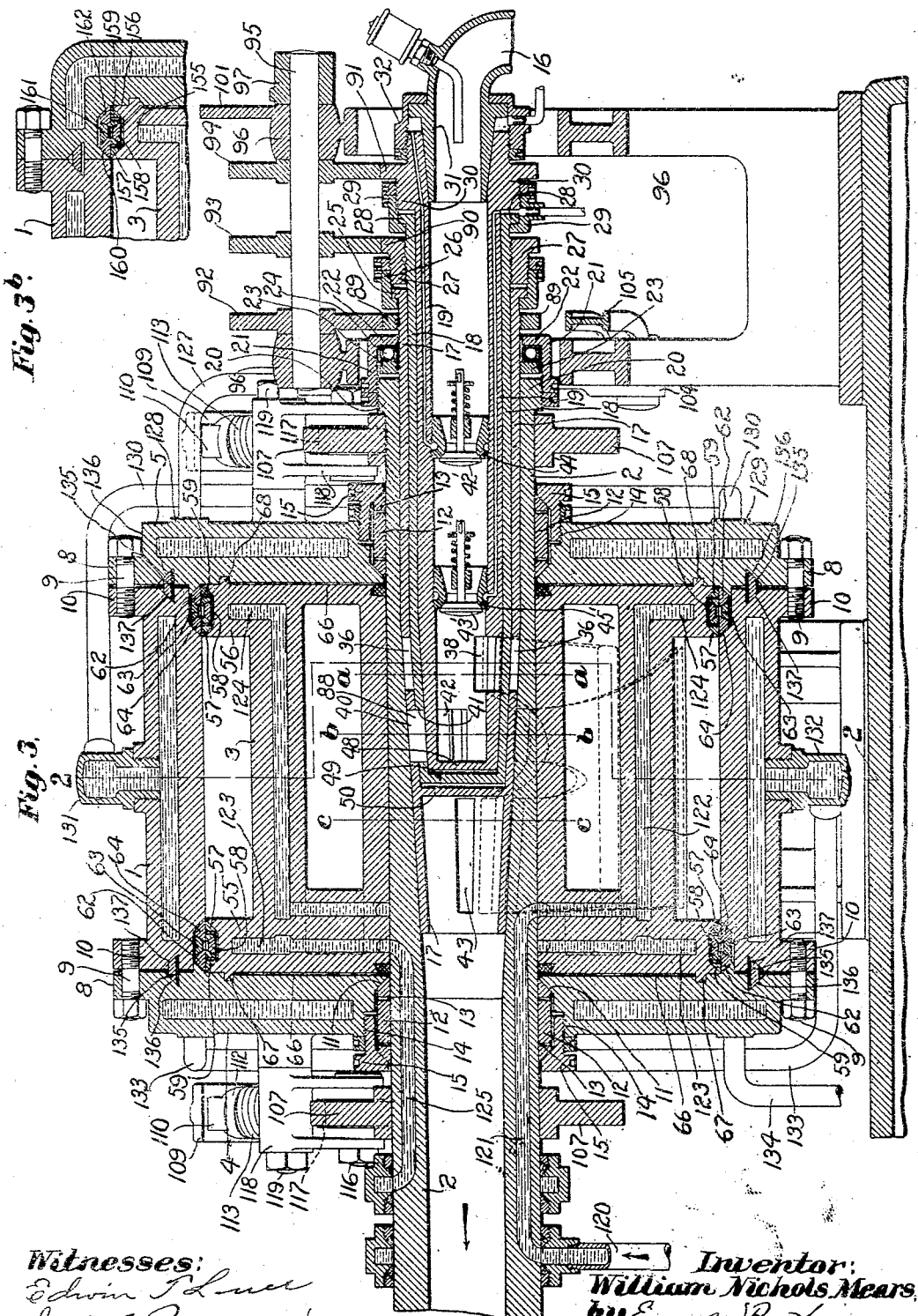

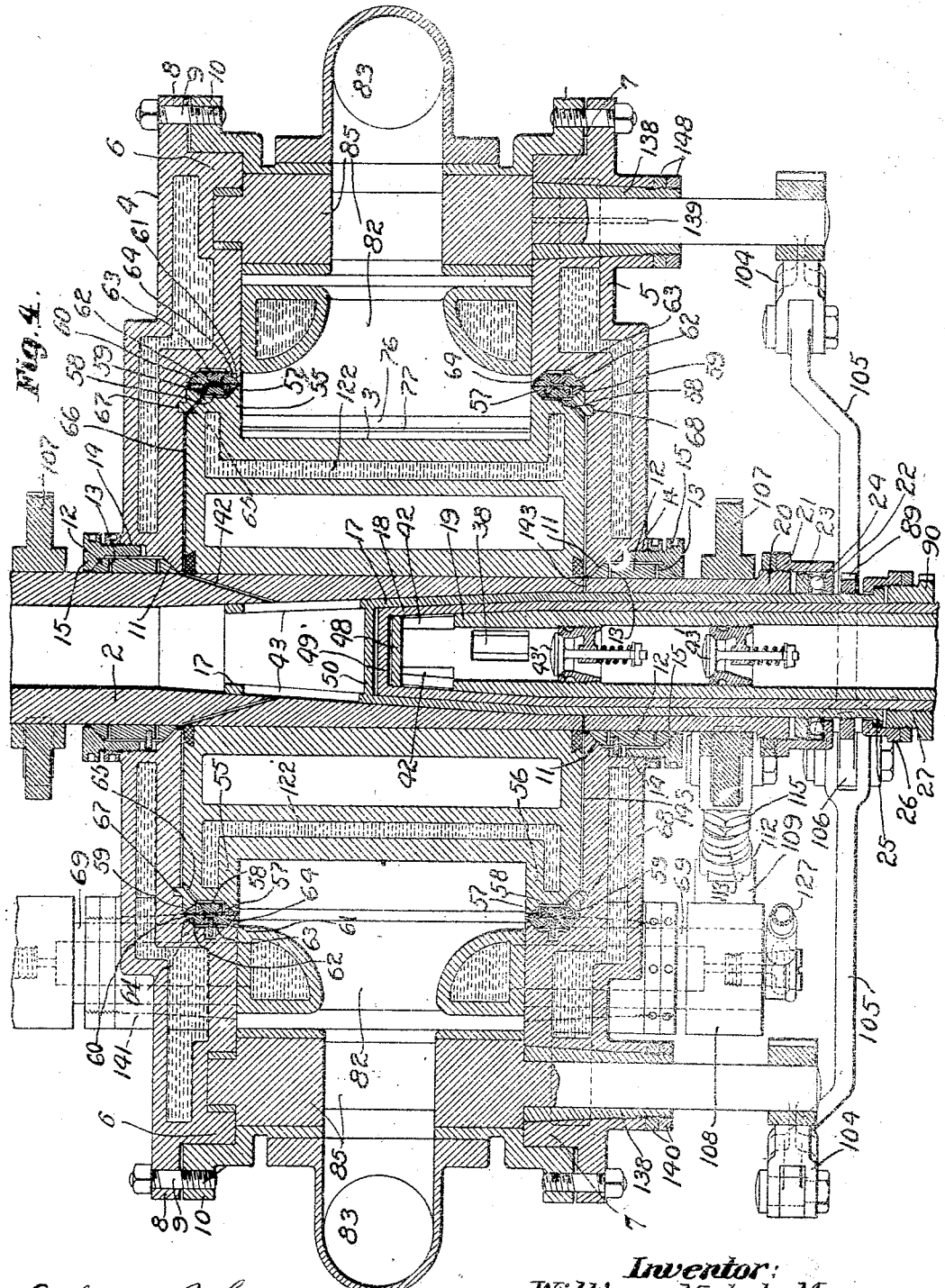

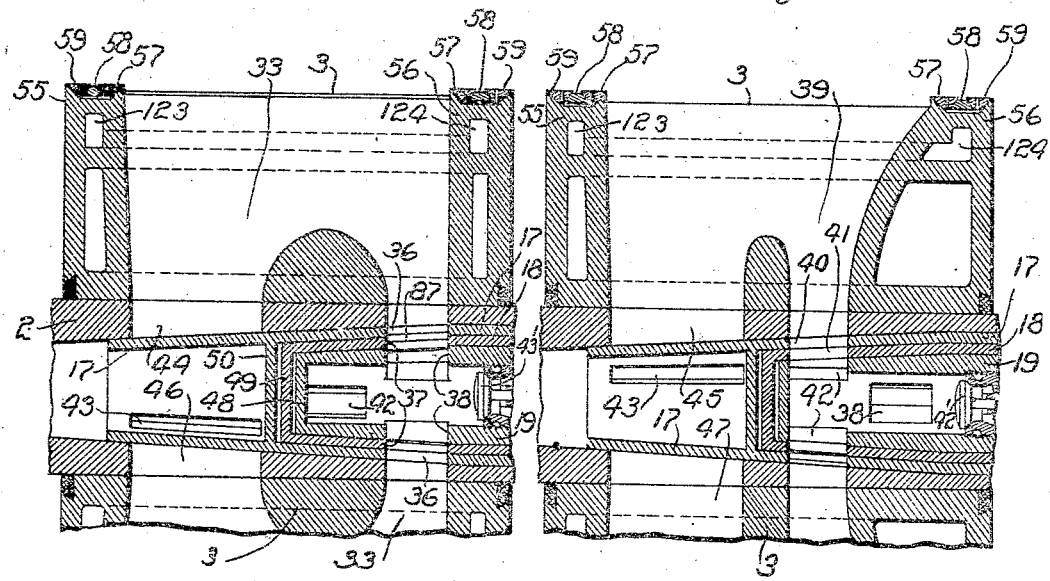
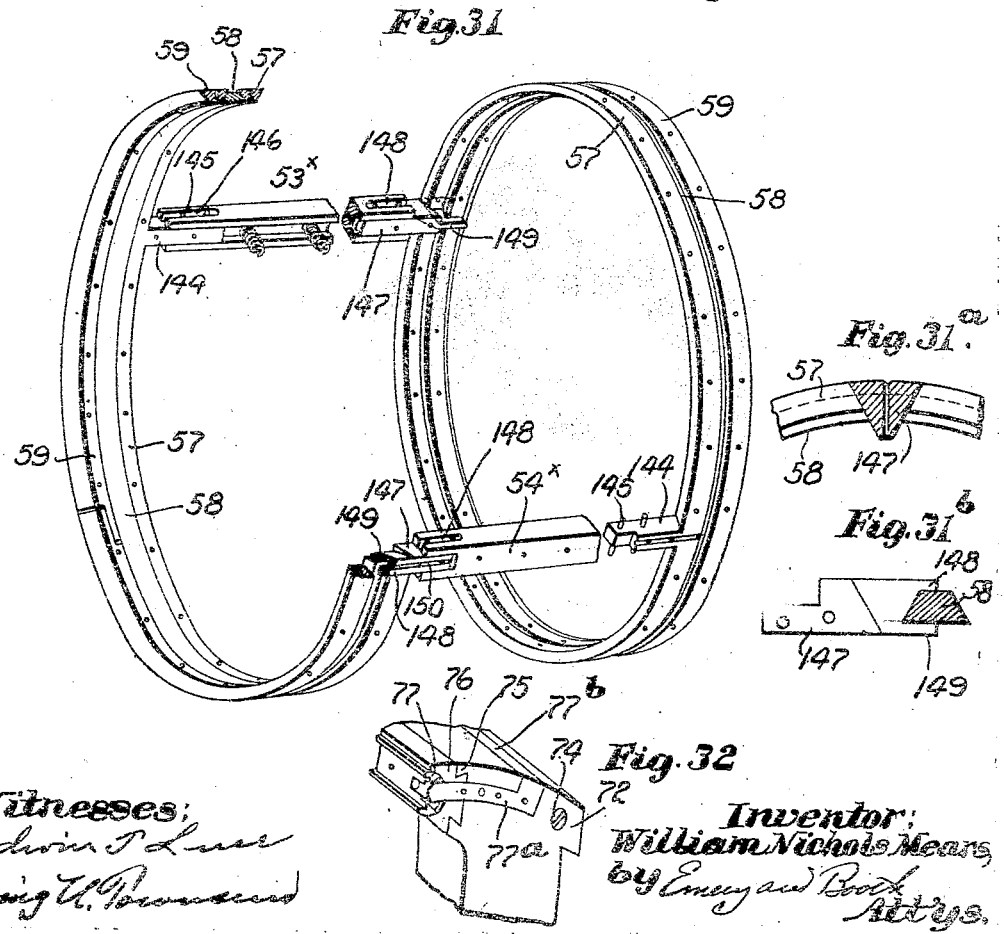

W. N. MEARS.
ROTARY ENGINE.
APPLICATION FILED MAR. 10, 1908.

1,145,161.

Patented July 6, 1915.
7 SHEETS—SHEET 6.

Witnesses:

Inventor:
William Nichols Mears,
by Emery and Booth
Attys.

W. N. MEARS.
ROTARY ENGINE.
APPLICATION FILED MAR. 10, 1908.
1,145,161.
Patented July 6, 1915.
7 SHEETS—SHEET 7.
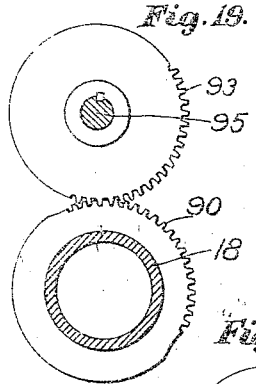
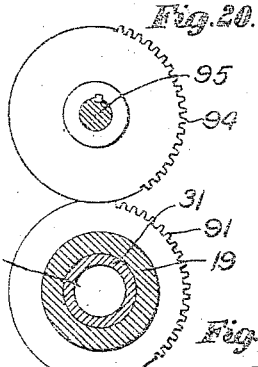
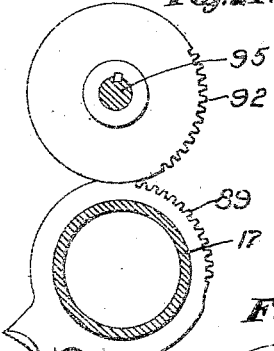
Fig. 19. Fig. 20. Fig. 21.
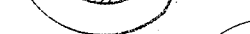
Fig. 22. Fig. 23. Fig. 24.
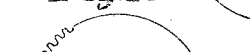
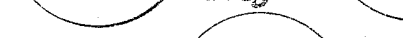
Fig. 25. Fig. 26. Fig. 27.
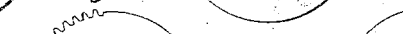
Fig. 28. Fig. 29. Fig. 30.
Witnesses:
Inventor:
William Nichols Mears,
by Emery and Booth
Attys.

UNITED STATES PATENT OFFICE.

WILLIAM NICHOLS MEARS, OF BROOKLINE, MASSACHUSETTS, ASSIGNOR TO AMERICAN ROTARY MOTOR COMPANY, OF BOSTON, MASSACHUSETTS, A CORPORATION OF MAINE.

ROTARY ENGINE.

1,145,161.  Specification of Letters Patent.  Patented July 6, 1915.

Application filed March 10, 1908. Serial No. 420,184.

*To all whom it may concern:*

Be it known that I, WILLIAM NICHOLS MEARS, a citizen of the United States, residing at Brookline, in the county of Norfolk and State of Massachusetts, have invented an Improvement in Rotary Engines, of which the following description, in connection with the accompanying drawings, is a specification, like letters on the drawings representing like parts.

This invention relates to rotary compressors and engines, preferably of the internal combustion type, wherein I may employ any suitable agent or agents. If a non-explosive agent or agents be employed, I may utilize steam, air or other fluid under pressure, and if an explosive mixture or mixtures be employed, I may utilize any suitable agents, as, for example, an explosive mixture of air and alcohol, or air and gasolene, or air and kerosene, or gas and in fact any suitable hydro-carbon or other agent, which, when mixed with air, or other suitable fluid, produces an explosive mixture. If desired, any suitable gas or other substance, whether fluid or non-fluid, may be employed, which when ignited produces an explosion that may be utilized in the production of rotary motion, or a continuously burning gas may be employed to be used alone or to be mixed with other agents of any suitable nature. I also contemplate the utilization of a plurality of explosive mixtures or substances, as, for example, alcohol and air or acetylene gas and air, it being apparent, however, that if a plurality of explosive substances or mixtures be employed, I may utilize an explosive agent. In the practice of my invention, the explosive substances, when of a fluid nature, are preferably supplied under pressure.

In order that the principles of my invention may be clearly understood, I have disclosed a single type or embodiment thereof in the accompanying drawings, wherein—

Figure 7:
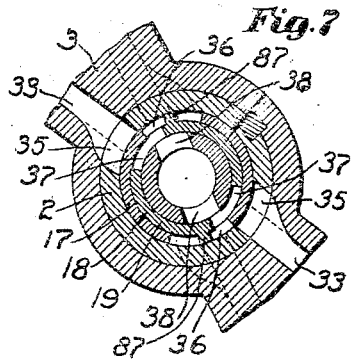
Figure 8:
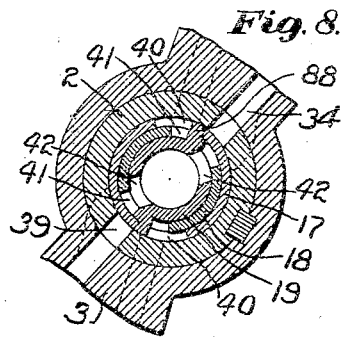
Figure 9:
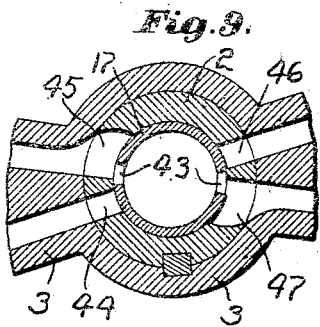
Figure 10:
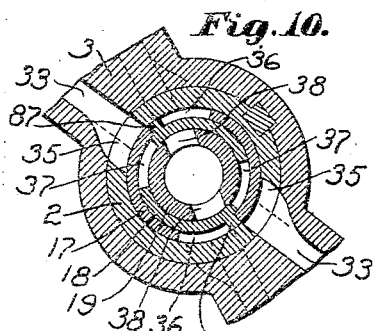
Figure 11:
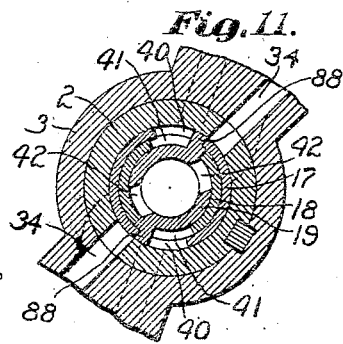
Figure 12:
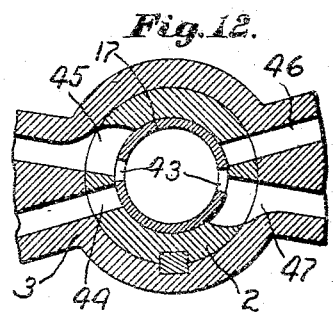
Figure 13:
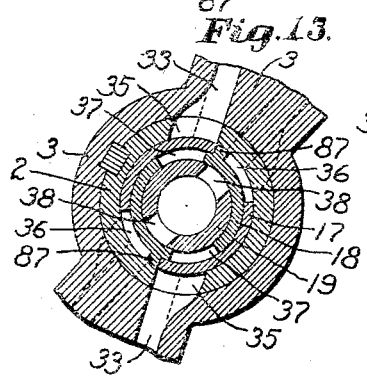
Figure 14:
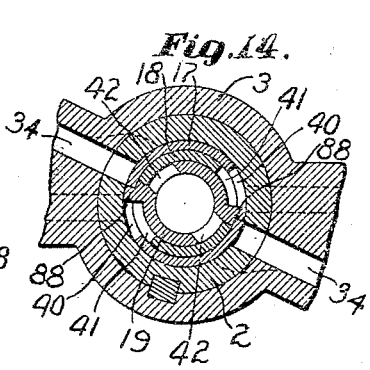
Figure 15:
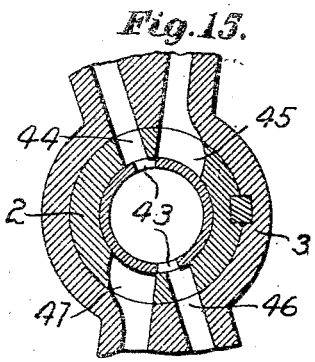
Figure 16:
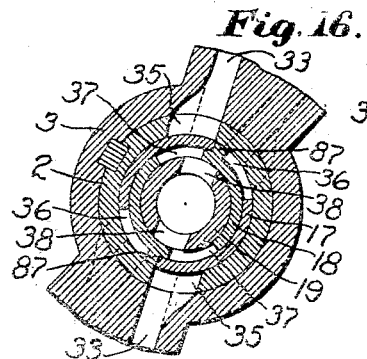
Figure 17:
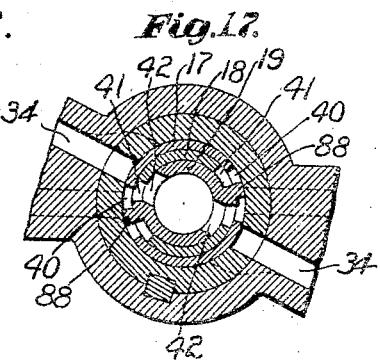
Figure 18:
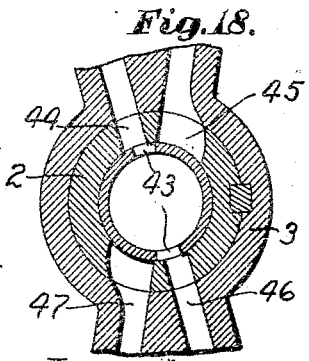

Figure 1 is an end elevation of a rotary engine, preferably of an explosive type, embodying one form of my invention; Fig. 2 is a vertical central transverse section of the engine represented in Fig. 1 taken upon the irregular dotted line 2—2 of Fig. 3; Fig. 3 is a central longitudinal vertical section thereof; Fig. 3ª is a sectional detail representing a construction of packing rings that may be employed in this type of my invention; Fig. 3ᵇ is a sectional detail representing the rotor as inset into the heads; Fig. 4 is a central longitudinal horizontal section thereof; Fig. 5 is a vertical longitudinal section through the rotor and representing, during the forward running of the engine, the admission and exhaust ports and valves respectively; Fig. 6 is a similar view through the rotor, and representing, during the reverse running of the engine, the admission and exhaust ports and valves respectively; Figs. 7 to 9 inclusive are vertical transverse sectional views taken respectively upon the lines $a$—$a$, $b$—$b$, and $c$—$c$ of Fig. 3, and representing respectively the position during forward running of the engine of the two sets of admission ports and the exhaust; Figs. 10 to 12 inclusive represent similar views of the same parts but indicating the closed position of the admission ports in forward running of the engine preliminary to the reverse thereof; Figs. 13 to 15 inclusive are similar views of the same parts but shifted for reversing the engine; Figs. 16 to 18 inclusive are similar views representing the same parts in position for reverse running of the engine, the reverse admission ports being opened; Figs. 19 to 30 inclusive are detail vertical transverse sectional views representing the position of the gears for operating the tubular members or valves controlling the admission ports and exhaust ports, the position of said gears corresponding in said figures to the position of the tubular members in Figs. 7 to 18 inclusive respectively; Fig. 31 is a perspective view of a form of packing that may be employed upon the rotor; Figs. 31ª and 31ᵇ are details of portions of the wearing ring shown in Fig. 31; Fig. 32 is a perspective view of a detail representing one form of means for holding in position the removable wearing face of the abutment or abutments.

Referring more particularly to that single type or embodiment of my invention herein illustrated, the engine herein represented is provided with a casing and an internal member, herein for convenience termed a rotor. In the practice of my invention, I impart a relative rotary movement to the casing and rotor. Movement of rotation may be imparted to either the casing or the rotor. In the present type of the invention, however, I have represented the rotor as mounted for rotation within the casing, which herein is stationary.

The casing wherein the rotor is mounted may be of any suitable outline in cross section, being either circular or non-circular, as is found best adapted to the particular requirements of the type of engine wherein my invention is employed. Referring more particularly to Figs. 2, 3 and 4, the casing, which herein is represented as substantially circular in cross section and is stationary, is indicated at 1, it being adapted to receive therein for rotary motion a shaft 2 mounted in suitable bearings (see Fig. 3) preferably provided therefor in the heads. Mounted within the casing 1 and keyed upon the shaft 2 is a rotor 3 of any suitable type and inclosing the rotor within the casing are provided suitable heads 4 and 5, both of which are preferably removable from the casing 1. While I may secure the heads 4 and 5 to the casing 1 in any suitable manner and may construct the heads in the form that is found most desirable, herein (see Fig. 4) I extend opposite substantially semi-cylindrical portions 6—6 and 7—7 of each head into the casing 1 at opposite sides thereof, it being apparent that a portion or the whole of either or both heads may be received within the casing or that a portion of the casing may be received within the heads. I may, in certain forms of my invention, form the heads and casing flush and inset the rotor into the heads. In the preferred type of the invention, however, I have represented each of the heads as having a portion extending into the casing and encircling rim 8 adapted to be positioned adjacent the ends of the casing. The portions 6 and 7 of the heads should, to secure the best results, be tightly fitted within the casing where contacting with the inner face thereof. Preferably the rims 8, which, for the best results, should be continuous, are tightly fitted against the opposing ends of the casing 1, being secured thereto by bolts 9 passing through said rims 8 and flanged portions 10 of the casing, the rims being drawn into the desired relation with respect to the casing.

Within each of the heads 4 and 5 is provided an opening to receive the shaft 2, and in this embodiment of my invention I preferably taper said opening inwardly as represented at 11 (see Figs. 3 and 4) and mount therein a split bearing ring or collar 12 having opposite beveled ends and provided with oiling passages 13 of any suitable construction. The openings in the heads wherein the shaft is mounted are provided with enlarged portions internally screw threaded, as represented at 14, to receive internally threaded collars 15 having beveled portions engaging the outer correspondingly shaped portion of the split rings or collars 12, whereby the latter may be forced into close relation with the inner walls of said openings and wear be taken up. It is apparent that any other suitable construction may be provided.

The motive agent or agents may be introduced in any suitable manner. If desired, I may introduce the same through the rotor and also through the casing in substantially the manner disclosed in my co-pending application No. 407,235. Preferably, however, and in this type of my invention, I introduce the motive agent or agents into the casing only through the rotor, though I desire it to be distinctly understood that I am in no wise to be limited thereto.

The manner of introduction of the motive agent or agents into the rotor depends upon the speed of the engine and the nature of the said agent or agents; in some cases it being preferable to mix a plurality of agents prior to their introduction into the rotor, and in other cases it being desirable to mix them within the rotor. It is apparent furthermore that if a plurality of agents be employed, I may mix certain of them prior to their introduction into the rotor and further mix the same or other agents within the rotor. To this end, any suitable construction may be provided. In the present type of the invention, I introduce (see Fig. 3) a suitable motive agent through the tube or inlet 16 within the shaft 2. The admission of the motive agent or agents from the inlet 16 into the rotor and its discharge therefrom may be controlled in any suitable manner. In the present type of my invention I have for the purpose provided within the shaft 2 a tubular member, valve or sleeve 17 receiving therein a second tubular member, valve or sleeve 18, which receives therein a third sleeve, valve or tubular member 19. While said tubular members may be positioned in any suitable manner for movement within and relative to the shaft 2, and to each other, I have herein provided one end of the shaft 2 with a screw threaded portion 20 receiving thereon an internally threaded collar 21 provided with an inwardly directed flange portion 22. Adjacent such flange portion of the collar the tubular member 17 is provided with a projecting portion, herein formed as a nut 23, whereby the tubular portion 17 may be held from axial movement. If desired, ball bearings 24 may be provided between the flange 22 and nut 23. The end portion of the tubular member 17 is herein represented as provided with an outwardly directed flange portion 25 with which engages a collar 26 internally screw threaded to engage a portion of the tubular member 18, the latter being herein represented as provided with a nut 27 for that purpose. The tubular member 18 is in turn provided with a flange portion 28 with which engages a collar 29 internally screw threaded to be received upon the thread portion 30 of the tubular member 19. It is apparent that any other suitable means may be provided to hold the tubular members in proper position. As indicated most clearly in Fig. 3, a portion of each of the tubular members 17, 18 and 19 as well as of the shaft 2 is represented as tapering to permit the taking up of wear and the maintaining of a tight joint therebetween. The inlet 16 may be suitably connected in any manner with the shaft 2 or the parts mounted therein. Herein said inlet is represented as having a tapered portion 31 projecting into the tubular member 19, a collar 32 being provided to secure the same in position and to take up wear.

I contemplate the provision of means for controlling the introduction of the motive agent or agents into the rotor. Not only may I employ means for varying or regulating in any desired manner the introduction of the motive agent or agents however introduced into the rotor, but in that type of my invention embodied in a reversible engine I preferably provide means whereby, when the engine is operative in one direction, one or more of the motive agent inlets may be closed in whole or in part, and whereby, when the engine is operative in the opposite direction, the inlet or inlets previously closed may be opened in whole or in part. While any suitable construction may be provided to accomplish this end, I have in the present embodiment thereof provided means permitting the introduction of one or more motive agents into the rotor, preferably through a first series of passages herein, as shown at 33 in Fig. 2, represented as opposed to each other, said series of passages being operative when the engine is operating in the forward direction and through a second series of passages 34, which, as shown in Fig. 2, may be likewise opposed to each other, said second series being operative when the engine is reversed. It will, of course, be apparent that one or any suitable number of passages may be provided to introduce the motive agent or agents through the rotor for operating the engine in the forward direction, and that one or any suitable number of passages may be provided to introduce the motive agent or agents when the engine is operating in the reverse direction.

In order to introduce the motive agent or agents into the rotor and to permit the same to be exhausted therethrough when desired, I have provided the shaft 2 and the tubular members 17, 18 and 19 with certain ports represented in Figs. 2, 3, 4, 5, 6 and 7 to 18 inclusive. In order to introduce the motive agent or agents into the passages 33—33 for the forward driving of the engine, the shaft 2 and the tubular members 17, 18 and 19 are provided respectively with ports 35—35, 36—36, 37—37 and 38—38, as indicated most clearly in Figs. 2, 5, 6 and 7. Preferably axially and circumferentially separated from said series of ports are provided other series of ports 39—39, 40—40, 41—41 and 42—42, Fig. 17, whereby the motive agent or agents may be introduced into the passages 34 for operating the engine in the reverse direction. As previously stated, any desired number of motive agents may be introduced into the combustion chamber or chambers.

As represented more particularly in Fig. 3, I contemplate introducing one motive agent through the inlet 16, preferably axially of the tubular member 19, and provide in the latter a plurality of check valves 42' and 43', as indicated in Figs. 3 and 4, said check valves being of any suitable type, as, for example, such as described in my said co-pending application No. 407,235. If I desire to admit one or more motive agents, in addition to that referred to as introduced through the inlet 16, they may be introduced in any suitable manner. Preferably, however, I introduce a second motive agent through the seat of the valve 42', as indicated at 44', and a third motive agent through the seat of the valve 43', as indicated at 45', whereby if desired the additional motive agents may be sprayed or comminuted into fine particles by the incoming rush of the motive agents introduced through the inlet 19. If it be desired, to introduce an additional motive agent, it may, however, be mixed in any other manner, as, for example, exteriorly of the engine. It will be understood that the admission of the additional motive agents through the ports 44' and 45' will be controlled by suitable valves, so that either or both of said agents may be cut off. If it be desired to cut off the supply of additional motive agents, the valves 42' and 43' would act simply as check valves. The motive agent or agents introduced through the rotor into the casing may be exhausted therefrom in any suitable manner. Preferably a portion at least thereof is exhausted through the rotor and the shaft 2. While any construction may be provided to accomplish this result, herein I have provided the tubular member 17 (see Fig. 3) with one or more ports 43, two being herein indicated. As shown most clearly in Figs. 9, 12, 15 and 18, the shaft adjacent the ports 43 is provided preferably with ports 44, 45, 46, and 47 adapted to communicate, as will be more fully described, with said ports 43, thereby permitting the motive agent or agents to be exhausted through the rotor into the shaft, and thence in the direction of the arrow indicated in Fig. 3 to any desired point. Any suitable means may be provided to prevent admixture of the exhaust with the entering agent or agents. Herein, for the purpose, I have represented (see Fig. 3) the tubular member 19 as terminating in a transverse web 48. If desired, and as herein represented, the tubular member 18 may similarly terminate in a transverse web 49, the tubular member 17 being represented as having a transverse web 50 intermediate its ends.

The shape of the rotor 3 in cross section may be such as is desired. Preferably (see Fig. 2) it is of a general elliptical form and may be of the form in cross section fully disclosed in my co-pending application No. 407,235. In the present type of the invention, the peripheral surface thereof is provided with oppositely disposed portions 51 and 52 concentric with the center of rotation thereof and cut by its shorter axis. At a peripheral point intermediate the concentric portions 51 and 52 and preferably so disposed as to be cut by the longer axis of the rotor I provide casing contacting portions 53 and 54 which may be of any suitable extent ranging from substantially a mere line contact to any suitable area as found necessary in the particular type of engine wherein my invention is embodied. If desired, the contacting portions 53 and 54 may be concentric and may in any event be provided with packing strips 53$^x$ and 54$^x$, as indicated in Fig. 2, of any suitable construction. The strips 53$^x$ and 54$^x$ are recessed upon their inner faces to reduce centrifugal action. The portions of the peripheral surface of the rotor intermediate the portions 51, 52, 53 and 54 may be of any preferred contour and extent. Preferably, however, the terminal portions of such intermediate portions merge so gradually into the adjacent concentric portions or adjacent casing contacting portions that when the abutments are in engagement with such terminal portions, there is the minimum amount of radial movement of the abutments.

When the engine is operating in the forward direction, the motive agent or agents are introduced through the passage or passages 33 in the rotor and preferably at opposite points, whereby through the coöperation of abutments hereinafter more fully described the rotor is driven in a forward direction. The motive agent or agents during such forward movement of the rotor may be exhausted either in whole or in part through the rotor. In the specific type of the invention herein disclosed, when the engine is operating in a forward direction, the motive agent or agents are exhausted partially through the passages 34—34, which serve as inlets when the engine is reversed, said passages 34 being during the forward driving of the engine in communication with the exhaust through the ports 43—43 and the corresponding ports in the shaft 2. During the reverse driving of the engine, the motive agent or agents are introduced through the passages 34—34 and are exhausted through the passage or passages 33. Hence, in this type of the invention, in either direction of rotation of the engine, the motive agent or agents are exhausted through the rotor. As will be hereinafter more fully described, I may, during certain stages of the operation and particularly during the forward working of the engine, permit the exhaust of the motive agent or agents or a portion thereof otherwise than through the rotor.

Referring more particularly to Fig. 4, it will be observed that the rotor is provided in this type of the invention at opposite faces with flanges 55 and 56 contacting with an edge of the inset portions 6—6 and 7—7 of the heads 4 and 5 at the points where the same are provided and with the inner surface of the casing 1 intermediate such inset portions. It will be apparent from the construction of the rotor indicated in Fig. 2 that while the flanges 55 and 56 are concentrically formed with relation to the axis of rotation of the rotor, the extent of their radial projection beyond the peripheral surface of the rotor ranges from zero at the contacting portions 53 and 54 to a maximum amount at intermediate points. I may provide any suitable means to secure a tight fit between the rotor and the casing and heads. Herein, for the purpose, (see Fig. 4) I have provided each of the flanges 55 and 56 with packing rings. Preferably I employ in each instance three split packing rings 57, 58 and 59 received within an annular groove provided in such flanged portions, the wall of the groove being outwardly flared as represented. The rings are in cross section substantially of the shape indicated in Fig. 4, the outer rings 57 and 58 having outer flaring edges to be received upon the flaring walls of the groove and inner flaring edges to co-act with correspondingly flared edges of the intermediate ring 58. It will be apparent that the tendency of said split ring 58 is to spring outward and to force the split rings 57 and 59 radially outward and also toward the walls of the groove, thus maintaining a tight joint, not only upon the outer face of the flanges 55 and 56, but also at the inner and outer edges or corners of the said flanges. If desired and as herein indicated, the inner edge of the inset portions 6 and 7 of the heads and the portions of the casing circumferentially in line with said inset portions may be provided with similar grooves 60 and 61, wherein are received packing or wearing strips 62, 63 and 64 similar to the strips 57, 58 and 59 and coöperating therewith to maintain a tight joint. If desired and as indicated at the right hand portion of Fig. 4, means may be provided, as represented at 65, for delivering a lubricant to the said packing or wearing strips, the oil being delivered thereto along the face 66 of the rotor to which it may be supplied in any suitable manner. The oil may be introduced to the faces of the rotor through the bearings in any suitable manner. If desired and as indicated in Fig. 4, one or both faces of the rotor may be provided with annular lips 67 and 68 to prevent the passage of lubricant beyond the packing strips and to direct the same thereto.

While any suitable type of abutment or abutments may be employed, preferably in this type of my invention, I employ a plurality of pivoted abutments, each of which has a single face adapted to contact with the peripheral face of the rotor, as fully described in my said co-pending application. Preferably each abutment, if a plurality be employed, is provided with a trunnion portion 69 received within a suitable recessed portion of the casing, the ends thereof projecting into and being suitably mounted for oscillation within the heads. If desired, a suitable wearing strip 70 may be interposed between the trunnion portion 69 and the recessed portion of the casing. It will be apparent that the impact upon each abutment is transmitted to and taken up by the strip or strips 70.

I contemplate the provision of means for cushioning the outward radial movement of the abutment or abutments. While this may be done in any suitable manner, I have herein provided recesses or chambers 71 in the casing in the rear of the abutments. The adjacent portion of each abutment is preferably provided with a projection 72 adapted to enter the recess 71 and to compress the motive agent when the abutment is in its inner radial position. It is apparent that instead of employing the motive agent or agents for this purpose, I may employ any suitable cushioning fluid introduced in any suitable manner. The projection 72 is preferably of such extent as to leave a space between the outer face of the same and the inner wall of the pockets 71. If desired, a passage 73 suitably situated may be employed to permit the escape of the compressed motive agent from the pocket 71. I may, if desired, employ any suitable means, and herein a valve 74, to regulate the escape of the cushioning fluid from said pocket. If desired, the portion or portions of each abutment that contacts with the rotor may be formed integrally with such abutment and may be of any suitable extent circumferentially of the rotor. Preferably, however, in order to permit the removal thereof if worn and for other purposes, I provide a detachable portion which I mount upon each portion of the edge of the abutment that contacts with the rotor. Herein, I have represented each abutment as provided upon its inner portion with a dovetailed recess 75, wherein is received a strip or holder 76 of suitable wear resisting material. While the rotor may contact directly with the portion of the main web of the abutment or of the holder 75, preferably I mount in the latter an oscillatory shoe 77 of the type fully described in my said co-pending application. Preferably I suitably longitudinally concave or recess the inner face of the strip or holder as represented, and within the recessed portion I mount the correspondingly concaved face of the said shoe. To retain such shoe in operative relation to its holder when in such position I may provide any suitable holding means. Each shoe is so formed as to provide two lines of contact between the shoe and the rotor throughout the period of contact of such shoe with the rotor. To that end I preferably longitudinally recess or channel each shoe, leaving opposite rims providing separated lines of contact with the rotor. Preferably such shoe is so formed as to provide two lines of contact with the rotor. While the shoes 77 may be held in position in any suitable manner, preferably and as shown most clearly in Fig. 32, I provide packing or wearing strips 77$^a$ at each end of the abutment and making suitable joint with a strip 77$^b$ along its face. Said strips 77$^a$ may be suitably pinned to the abutment and may be inset thereinto and extend along the ends of the holder 75 and the shoe 76, which may be recessed to receive them. The recesses in the shoe may be flared as represented in Fig. 32 to permit the rocking of the shoe. The end of each strip 77$^a$ is preferably inturned and is received in a semi-circular or other suitably shaped recess in the channeled portion of the rotor contacting face of the shoe, the inturned end of each strip being preferably rounded to conform to the recesses in the shoe. I contemplate the introduction of a fluid or fluids to the rotor contacting edge of the abutment or abutments. Preferably I introduce water at this point to remove the carbon deposit from the interior of the engine and also to cool the walls of the combustion chamber and to assist in the formation of steam, thus augmenting the motive power of the engine. It is apparent that in the construction of parts indicated in Fig. 2, the abutment or abutments 82 are forced inward by the pressure of the exhaust upon the rear thereof. The admission of water under suitable pressure to the rotor contacting edge of the abutment counterbalances more or less such forward pressure upon the abutment or abutments. While such water may be introduced in any suitable manner, preferably I employ for this purpose a portion of the temperature regulating agent introduced into the interior of the abutment. To that end, I have herein represented the abutment holder and shoe as provided with a passage 78 establishing communication with the interior of the abutment and the rotor contacting edge. If desired, I may also introduce a lubricating fluid to the said rotor contacting edge. This may be done in any suitable way, as for example, in the manner fully illustrated and described in my said co-pending application.

If desired, I may introduce the motive agent or agents to the contacting face of the abutment, and herein to the inner face of the shoe 77, as by providing a passage or passages 78' which may lead from either side of the abutment, as represented in Fig. 2. The introduction of the motive agent or agents at this point acts to counterbalance more or less the inward pressure upon the abutments and also to a certain extent to lubricate the adjacent faces of the shoe and holder, the motive agent or agents preferably containing a certain proportion of lubricant effective for this purpose. The exhaust passes through the passage 73 into the compression chamber 71 and also acts upon the angled face of the abutment adjacent said chamber, thereby tending to force the abutment inward, since the areas thus acted upon exceed the area of the rotor contacting face of the abutment.

It will be apparent that I am enabled, if desired, to avoid the use of springs within the engine tending to maintain the abutment or abutments in contact with the rotor. By permitting the agent or agents, as, for example, the exhaust to force the abutment or abutments inward, I thus assist such mechanical agencies as I may employ preferably exteriorly of the engine for this purpose. I may, if desired, provide means to maintain a tight joint and to take up wear between the abutment or abutments and the adjacent face of the casing. While this may be done in any suitable manner, herein I have represented a detachable strip 79 seated in a recessed portion of the casing and having a face shaped to conform to and contacting with the adjacent face of the abutment, said strip being herein represented as tapering inwardly. The strip 79 may be held in place in any suitable manner. Herein for the purpose I have represented a screw 80 received within a screw threaded portion 81 of the casing, said screw having its inner end secured to the strip 79. It will be apparent that upon manipulation of the said screw, wear may be taken up and a tight joint maintained between the parts. I have, in this type of the invention, provided means whereby, if desired, the motive agent or agents or a portion thereof may be exhausted through the abutment or abutments. For that purpose I have herein represented each abutment as provided with an opening 82. In the rear of said abutment or abutments are provided exhaust passages 83 leading to any desired point. Preferably, I provide means whereby said passages may be closed, thus preventing the escape of the exhaust therethrough, in which event the exhaust will, in this type of the invention, pass through the rotor. While I may accomplish this result in any suitable manner, herein I provide transverse partitions 84 and locate adjacent thereto suitable valves 85 and 87. It is, of course, apparent that a single valve may be employed or any suitable construction utilized for this purpose.

Inasmuch as, in the present type of my invention, the motive agent or agents are introduced preferably through the rotor into the combustion chamber or chambers, and inasmuch as I herein employ two passages or two sets of passages, one operative when the engine is running in the forward direction and the other operative when the engine is reversed, I provide means whereby the forward running admission ports are opened preferably intermittently during the forward driving of the engine and also provide means whereby the port or ports operative when the engine is reversed, remain closed during the forward drive of the engine. I also provide means whereby this condition is reversed during the reverse driving of the engine. It is apparent that this may be accomplished in different ways within the scope of my invention. Herein, however, for the purpose, I have provided tubular members, valves or sleeves 17, 18 and 19 mounted within the shaft 2, said tubular members being held from rotation with the shaft by means to be hereinafter more fully described. As previously stated, I have provided in the shaft 2 and in the tubular members ports 35 to 38 inclusive to admit the motive agent or agents during the forward driving of the engine and ports 39 to 42 inclusive operative when the engine is reversed.

In Figs. 7 to 18 inclusive, I have represented the position of the tubular members and their passages during the forward running of the engine and also when the engine is running in the opposite direction and the intermediate positioning during the change from forward to reverse drive.

In Fig. 2, I have indicated the relative position of the ports in said shaft 2 and tubular members during the forward driving of the engine, it being understood that the rotor is then moving in the direction of the arrow in said figure, so that during each rotation of the rotor each direct inlet passage 35 receives the motive agent or agents through each of the ports 35, 36, 37 and 38. Fig. 7 represents the said parts in the same position as shown in Fig. 2. Fig. 8 represents the position of the reverse inlet ports during the forward driving of the engine, and Fig. 9 represents the position of the exhaust ports during the forward drive. Viewing Figs. 7 and 8, it will be apparent that the tubular member 18 is provided with a lip 87 projecting into the port 36 in the tubular member 17. By shifting the tubular member 18 relatively to the tubular member 17, as indicated in Fig. 7, it will be apparent that the area of the admission port in the tubular member 17 will be increased, and that by shifting the same in the opposite direction the area thereof will be diminished. During the forward running of the engine, the reverse admission ports 40 in the tubular member 17 are closed. This condition is represented in Fig. 8 wherein the tubular member 19 is represented as provided with a lip 88 extending through the port 41 in the tubular member 18 and into the port 40 in the tubular member 17. By movement of the tubular member 19 with respect to the tubular member 17, it is apparent that the reverse admission ports in said tubular members and the shaft may be rendered operative. It is apparent that the amount of the admission through the reverse admission ports may be controlled by the position of the tubular member 19. In Fig. 9 I have represented the position of the exhaust ports in the tubular member 17 during the forward drive of the engine, it being understood that during the forward driving of the engine the exhaust occurs through the ports 44 and 46.

Any suitable means may be provided to impart the necessary movements to the tubular members 17, 18 and 19. Herein for the purpose (see Fig. 3) I have represented the said tubular members as provided with gears 89, 90 and 91 respectively, wherewith are adapted to engage gears 92, 93 and 94 mounted upon a shaft 95 (see also Fig. 1) supported in suitable bearings provided in a bracket or brackets 96 rising from the bed of the engine. If desired, means may be employed to operate the gears 92, 93 and 94 to shift the tubular members 17, 18 and 19. Herein for the purpose I have represented a lever arm 97 pivoted upon the shaft 95 and having a handle 98 and a pivoted member 99 provided with a pawl 100 adapted to engage the teeth of a stationary ratchet 101 whereby the shaft 95 may be shifted to the desired extent in either direction and locked in the desired position. To permit the engine to run in the forward direction with the ports 36 in the tubular member 17 fully opened, the lever 97 is moved as far as possible to the left viewing Fig. 1. To reverse the engine, the lever 97 is moved to the right viewing Fig. 1, the pivoted member 99 being operated to retract the pawl 100 so that the lever may be shifted to engage the ratchet teeth at the left of the shaft 95 viewing said figure.

Assuming the engine to be running in the forward direction, in which event the ports in the several tubular members and in the shaft 2 are positioned as indicated in Figs. 7, 8 and 9, and it being desired to reverse the engine, the tubular member 18 is shifted to close the inlet ports 36 in the tubular member 17, as represented in Fig. 10. While I may employ any suitable means to effect the desired shifting of the tubular members, herein I have formed the gears 89, 90, 92, 93 and 94 upon the tubular members and the shaft 95 respectively as segmental gears, as more fully indicated in Figs. 19 to 30 inclusive. Viewing Figs. 7 and 10 and 19 and 22 respectively, it will be apparent that the engagement and movement of the segmental gears 90 and 93 effects the desired shifting of the tubular member 18 to close the inlet ports 36 in the tubular member 17. Viewing Figs. 11 and 12 and 23 and 24 respectively, it will be apparent that during such shifting of the tubular member 18, the position and condition of the reverse admission ports and of the exhaust remain unchanged. Viewing Figs. 13, 14, 15 and 25, 26 and 27, it will be apparent that all of the tubular members 17, 18 and 19 have been moved as a unit by the engagement of the segmental gears in order to position the exhaust for reversing. During this movement, the direct admission ports 36—36 remain closed and the reverse admission ports 40—40 as yet remain closed. Finally, and viewing Figs. 16, 17 and 18 and 28, 29 and 30, it will be apparent that while the direct admission ports 36—36 remain closed and the exhaust remains in the position to which it is shifted, as represented in Fig. 15, the reverse admission ports 40—40 are opened by the shifting of the tubular member 19 upon the continued movement of the segmental gears 91 and 94, as represented in Fig. 29. It will be of course understood that any suitable means may be employed to reverse the engine.

Since, in this type of my invention, when the engine is operating in the reverse direction, the exhaust may occur not only through the rotor but also through the exhaust passages in the abutments, I may introduce a larger volume of the motive agent or agents through the passages 33—33 for direct driving, and therefore in Fig. 7 and elsewhere I have indicated the enlargement of the inner ends of the said passages 33—33 so that the latter may be in communication for a longer period of time with the inlet ports. Viewing Figs. 9, 12, 15 and 18, it will be apparent that the inner ends of the exhaust ports 45 and 47, and which are operative when the engine is operating in the reverse direction, are enlarged to permit an extended period of contact between said exhaust passages and the ports in the tubular member 17, this being desirable in the present type of my invention, inasmuch as during the reverse movement of the engine the exhaust occurs only through the rotor.

In shifting the engine from the forward drive to the reverse, inasmuch as the exhaust during the reverse occurs only through the rotor, I close the several valves 85 in the rear of the abutments 82. While this may be accomplished in any suitable manner, I preferably (see Fig. 1) provide said valves with intermeshing segmental gears 102 and 103 upon movement of which the valves may be opened or closed. Any suitable means may be employed to operate said gears. Herein for the purpose I have represented one of each pair of said valves exteriorly of the engine head as provided with an arm 104 to which is pivotally connected a link 105 pivotally connected in turn to a lug 106 projecting from the gear 89 upon the outer tubular member 17, it being apparent that upon movement of the latter gear in either direction the valves are opened or closed as required. Preferably, in this type of my invention, I employ means to move the abutment or abutments toward and from the center of rotation of the rotor, this being desirable because of the shape of the latter and the fact that to permit engagement of the abutment or abutments and the surface of the rotor, the said abutment or abutments must assume different radial positions. Furthermore, it is desirable to increase or diminish the inward pressure upon the abutment or abutments during each rotation of the rotor. It is apparent that these results may be accomplished in any desired manner. Herein for the purpose (see Fig. 1) I have indicated a cam 107 mounted upon the shaft 2, the contour of said cam conforming substantially to that of the rotor. Preferably, and as indicated in Fig. 3, I employ two cams, one exterior to each head of the engine. The trunnion or trunnions 69 of the abutment or abutments (see Fig. 2) are extended through one and preferably through both heads of the engine. In Fig. 1, I have represented the said trunnions as extended through the head 5. Preferably, upon the trunnion 69 exterior to one or both heads of the engine, I key arms 108 having members 109 provided with sockets 110 wherein are received for rocking movement relative thereto projecting portions 111 formed upon hollow guiding compression members 112. Surrounding said member is a coil spring 113, the outer end of said spring bearing upon a shoulder of said member as indicated. Received within said guiding member is a threaded bolt 114 receiving thereon nuts 115, one of which bears upon the coil spring 113, whereby the tension thereof may be adjusted. The adjustment and construction of the parts may be such that the parts are in effect rigid. Said threaded bolt 114 at its inner end is forked as represented in Fig. 3 to receive a pin 116 whereon is mounted for rotation a roll 117, the said roll bearing upon the periphery of the cam 107. The members 110 adjacent the sockets 111 are preferably provided with lateral wings (see dotted lines Fig. 1) to prevent lateral escape of the projections 111 from said sockets. Preferably I provide means to hold the roll or rolls 117 in contact with the cam or cams 107 and to guide the movements thereof. Herein for the purpose I have represented links 118, the inner ends of which are pivotally connected to the inner ends of the bolts 114, the opposite ends of said links being pivotally mounted upon the head or heads, as indicated at 119 in Fig. 1. If desired, the trunnions of the links 118 and the pins 116 of the rolls 117 may be hollow for the introduction of lubricant. It will thus be apparent that during the rotation of the rotor and of the cam or cams 107, the abutment or abutments are rocked upon their trunnions 69 and moved radially, so that they may be held in contact with the surface of the rotor.

If desired, I may introduce a temperature regulating agent into the engine. While such agent may be admitted thereinto in any desired manner and from any suitable source and may circulate through any desired portion thereof, preferably (see Fig. 3) I introduce the same through a pipe 120 into a passage 121 in the shaft 2 and then conduct the same into the interior of the rotor, as represented at 122, the said rotor having suitable passages therein for the purpose. The peripheral flanges of the rotor are provided with passages 123 and 124 for the reception of the temperature regulating agent. After the temperature regulating agent is withdrawn from the rotor in any suitable way, as, for example, through the passage 125 in the shaft 2, it is thence conducted as by a pipe 126 through such portions of the engine as may be desired. Preferably the temperature regulating agent is conducted, after passing through the rotor, into the abutments, through which it traverses from left to right viewing Fig. 3. It is then conducted into the head 5 through which it circulates, then into the casing, through which it is circulated, and then into the opposite head 4, through which it is circulated, it being finally withdrawn and discharged in any suitable manner or recirculated, as more fully described in my said co-pending application. Referring more specifically to Fig. 1, the pipe 126 (see dotted lines Fig. 1) is represented as having portions leading to the abutments 69. After traversing said abutments, the temperature regulating agent is conducted, as by pipes 127, to the top of the head 5 as indicated at 128. After circulating through the head the agent is discharged from the bottom thereof as indicated at 129 and is then conducted by suitable pipes 130 to the top of the casing, as indicated at 131. After circulating through the casing, it is withdrawn therefrom at the bottom, as indicated at 132, and then by suitable pipes 133, partially indicated in dotted lines in said figure, is conducted to the top of the casing 4, after circulating wherethrough it is discharged therefrom at the bottom, as indicated in dotted lines at 134 in Fig. 1.

If desired and as illustrated in Fig. 3, a split ring or a segmental member 135 may be inserted in grooves 136 and 137 formed respectively in the casing 1 and in the heads 4 and 5. Herein said split rings are represented as tapered in cross section and are received within grooves having walls correspondingly shaped to receive them.

In Fig. 4. I have represented means whereby a tight joint may be provided for the operating means for the exhaust valves where the same is received within the head or heads. Therein is represented at 138 a tapered sleeve split at one or more points lengthwise thereof, as illustrated in dotted lines at 139 and having a screw thread end, said sleeve being received within a correspondingly shaped socket in the head 5. Mounted upon the outer screw threaded portion of the sleeve are nuts 140, by adjustment of which the tapered sleeve may be axially moved within its support; and thereby compressed about the spindle for said exhaust valves. If desired and as represented in dotted lines in Fig. 4 at 141, each abutment at one or both ends may be provided with similar or any suitable means for providing a tight joint. If desired and as represented in Fig. 4, means may be provided to supply lubricant to the outer surface of the tubular member 17 at one or more points. Herein one or more passages 142 and 143 respectively are provided leading from the bearings provided in the heads 4 and 5.

In Figs. 31, 31ª and 31ᵇ, I have represented packing or wearing strips that may be provided in the rotor 3, as within the circumferential grooves provided with the flanged portions thereof. Viewing Fig. 31, therein are shown strips 57, 58 and 59, which may be the same as those illustrated in Fig. 4. If desired, said rings may be formed concentric throughout, as illustrated at the left hand side of said figure, or they may have suitably disposed eccentric portions, as indicated at the right hand side of said figure. Preferably I employ means connecting one or more of one series of rings with one or more of the other series of rings. Herein for the purpose I have provided strips 53ˣ and 54ˣ (see Fig. 2) received within the casing contacting portions of the rotor 3. Preferably each of said strips 53ˣ and 54ˣ is axially channeled, as indicated in Fig. 31, and may be provided with suitable oiling passages. Any suitable means may be provided to connect said strips to certain of the packing rings. Herein for the purpose I have indicated a portion 144 projecting from the inner face of the ring 57 and formed integrally therewith or attached thereto as desired, the said portion being received within the channel portion of the strip 53ˣ and connected thereto for relative movement of said parts, as by a pin 145 projecting from the portion 144 into a slot 146 formed in the strip 53ˣ. The opposite end of the strip 54ˣ may be connected in a similar manner to the inner face of the right hand ring 59. The opposite end of the strip 53ˣ may be operatively connected in any desired manner with one or more of the right hand packing rings represented in Fig. 31. Herein, for the purpose, I have represented a member 147 received within the opposite end of the channel strip 53ˣ for relative movement therein, as by a pin and slot connection 148. Said member 147 projects between the split ends of the left hand ring 59, as indicated more fully in Fig. 31ᵇ, and is provided with jaws 148 and 149 embracing the upper and lower faces of the intermediate ring 58. If desired, and as represented in Fig. 31, the opposite or left hand end of the strip 54ˣ may be provided with a similar member 150 engaging the intermediate left hand packing or wearing ring 58. It will be apparent that by providing members, such as herein described, for connecting two sets of packing rings, movement of the latter circumferentially of the rotor is prevented.

In Fig. 3ª, I have represented a construction of packing rings preferably split and either entire or segmental that may be employed in connection with this type of my invention, the said rings 151 and 152 conforming substantially in construction to the packing rings shown in my co-pending application No. 407,235. If desired, and as illustrated, I also provide similar rings 153 and 154 mounted in the casing and coöperating with the rings 151 and 152 to maintain a tight joint and to take up wear.

In Fig. 3ᵇ, I have represented a construction wherein the rotor 3, preferably flanged as indicated at 155, is inset into the heads, which for that purpose are suitably recessed, as indicated at 156. Any suitable packing and wearing strips may be employed in this type of my invention, as, for example, the packing strips represented in Fig. 31 or those represented in Fig. 3ª. Herein I have represented strips 157, 158 and 159 mounted in a suitable peripheral groove in the flanged portions of said rotor and strips 160, 161 and 162 mounted in an inner peripheral groove in the heads, said strips being herein represented as similar in cross section to those represented in Fig. 31.

I contemplate protecting the inside of the temperature regulating channels to prevent the rusting of the iron or steel in any suitable manner, as by coppering, tinning, plating, etc.

Having thus described one type or embodiment of my invention, I desire it to be understood that although specific terms are employed, they are used in a generic and descriptive sense and not for purposes of limitation, the scope of the invention being set forth in the following claims.

Claims:

1. A rotary engine comprising a casing and a relatively rotatable rotor mounted therein and provided with a shaft, means for introducing a motive agent or agents into the casing through one end of said shaft, and means for exhausting said agent or agents through the opposite end of said shaft, and means to change the point of admission of the motive agent or agents.

2. A rotary engine comprising a casing and a relatively rotatable rotor mounted therein and provided with a shaft, said rotor having opposite casing contacting portions, means for introducing a motive agent or agents into the casing through said shaft and through the rotor faces of said opposite portions, thereby to balance the rotor, and means for exhausting said agent or agents through said shaft.

3. A rotary engine comprising a casing and a relatively rotatable rotor mounted therein and provided with a shaft, said rotor having opposite casing contacting portions, means for introducing a motive agent or agents into the casing through the rotor at the faces of said opposite rotor portions, and means for exhausting said agent or agents through said opposite rotor portions.

4. A reversible rotary engine comprising a casing, and a relatively rotatable rotor mounted therein and provided with a shaft, said rotor having opposite casing contacting portions, means for introducing a motive agent or agents into the casing through the rotor faces of said opposite portions, means for exhausting the motive agent or agents axially through the rotor, means for reversing the engine, and means for changing the course of the exhaust through the rotor upon reversal of the engine.

5. A rotary engine comprising a casing, a relatively rotatable rotor mounted therein, a shaft for said rotor, means for introducing a motive agent or agents into said casing through one end of said shaft, means for changing the point of admission for said motive agent or agents, and means permitting the exhaust of said agent or agents through the other end of said shaft in either direction of operation of the engine.

6. A rotary engine comprising a casing and a relatively rotatable rotor mounted therein, means for introducing a motive agent or agents into said casing, means for changing the point of admission of said motive agent or agents, means permitting the exhaust of said agent or agents axially of the rotor and extraneously thereto, and means within the rotor for controlling the passage of the exhaust.

7. A rotary engine comprising a casing and a relatively rotatable rotor mounted therein and provided with a shaft, said rotor having opposite casing contacting portions, means for introducing a motive agent or agents into the casing through said shaft and through the rotor faces of said opposite portions, thereby to balance the rotor, an abutment or abutments mounted for movement toward and from the center of rotation of the rotor, and means for exhausting a portion at least of said agent or agents axially of the rotor.

8. A rotary engine comprising a casing and a relatively rotatable rotor mounted therein, an abutment or abutments mounted for movement toward and from the center of rotation of the rotor, means for introducing a motive agent or agents into the casing, and means permitting the exhaust of the motive agent or agents through the rotor and through said abutment or abutments.

9. A rotary engine comprising a casing and a relatively rotatable rotor mounted therein, an abutment or abutments mounted for movement toward and from the center of rotation of the rotor, means for introducing a motive agent or agents into the casing, means permitting the exhaust of the motive agent or agents through the rotor and through said abutment or abutments, and means controlling the exhaust through either or both the rotor and abutment or abutments.

10. A reversible rotary engine comprising a casing and a relatively rotatable rotor mounted therein and provided with a shaft, said rotor having opposite casing contacting portions, means for introducing a motive agent or agents into the casing through the rotor faces of said opposite portions, thereby to balance the rotor, means for exhausting the motive agent or agents through the rotor, means for reversing the engine, and means for changing the course of the exhaust through the rotor upon reversal of the engine.

11. A reversible rotary engine comprising a casing and a relatively rotatable rotor mounted therein, said rotor having one or more inlet passages therein for introducing motive force into the casing for the forward driving of the engine, and one or more inlet passages for introducing motive force into the casing for the reverse driving of the engine, one or more of said inlet passages acting as an exhaust passage or passages when the engine is running in the opposite direction.

12. A reversible rotary engine comprising a casing and a relatively rotatable rotor mounted therein, said rotor having one or more inlet passages therein for introducing motive force into the casing for the forward driving of the engine, and one or more inlet passages for introducing motive force into the casing for the reverse driving of the engine, and provisions whereby during the forward driving of the engine the motive force is exhausted through the rotor and also extraneously to the rotor, and whereby during the reverse driving of the engine the motive force is exhausted through the rotor.

13. A reversible rotary engine comprising a casing and a relatively rotatable rotor mounted therein, one or more swinging abutments mounted for movement toward and from the center of rotation of the rotor, and means whereby motive force may be introduced through the rotor to either the forward face or the exhaust face of the abutment or abutments, thereby to drive the engine in a forward or a reverse direction.

14. A reversible rotary engine comprising a casing and a relatively rotatable rotor mounted therein, one or more abutments pivoted for conjoint movement toward and conjoint from the center of rotation of the rotor and adapted to contact with the periphery thereof, and provisions whereby motive force may be introduced to either the forward face or the exhaust face of the abutment or abutments, thereby to drive the engine in a forward or a reverse direction.

15. A reversible rotary engine comprising a casing and a relatively rotatable rotor mounted therein, one or more abutments mounted for movement toward and from the center of rotation of the rotor, said abutment or abutments having provisions for the exhaust of motive force therethrough, and provisions whereby motive force may be introduced through the rotor to either the forward face or the exhaust face of the abutment or abutments, thereby to drive the engine in a forward or a reverse direction.

16. A rotary engine comprising a casing and a relatively rotatable rotor mounted therein and provided with a shaft, said rotor having opposite casing contacting portions, means for introducing a motive agent or agents into the casing through the rotor at the faces of said opposite rotor portions, and means for exhausting said agent or agents through the shaft.

17. A rotary engine comprising a casing and a relatively rotatable rotor mounted therein, means for admitting motive force into the casing, means for exhausting motive agency through the rotor, and also extraneously thereto, and means for closing either of said exhausts.

18. A rotary engine comprising a casing and a relatively rotatable rotor mounted therein, means for admitting motive force into the casing, means for exhausting motive agency through the rotor and also extraneously thereto, and means for closing said latter exhaust.

19. A rotary engine comprising a casing and a relatively rotatable rotor mounted therein, means for admitting motive agent into the casing, means for exhausting motive agency through a plurality of exits in the rotor, and means for changing the points of exit.

20. A reversible rotary engine comprising a casing and a relatively rotatable rotor mounted therein, means for admitting motive force into the casing, and one or more non-reversible pivoted abutments adapted to receive impact of motive force upon opposed portions, whereby the engine may be driven in either direction and means to exhaust through the rotor.

21. A rotary engine comprising a casing and a relatively rotatable rotor mounted therein, and a plurality of tapered valves within the rotor and axially thereof for admitting motive agent into the casing and for varying the amount of motive agent admitted therethrough and means for changing the point of admission of the motive force.

22. A rotary engine comprising a casing and a relatively rotatable rotor mounted therein, said rotor having a plurality of inlet passages therein for introducing motive agent into the casing axially of the rotor for the forward driving of the engine and also having a plurality of passages for exhausting the motive agent therethrough axially of the rotor.

23. A reversible rotary engine comprising a casing and a relatively rotatable rotor mounted therein, and nested co-axial means for admitting motive force into the casing for the direct and for the reverse driving of the engine, and means for changing the point of admission of the motive force.

24. A reversible rotary engine comprising a casing and a relatively rotatable rotor mounted therein, and nested means inside the engine for admitting motive agent into the casing for the direct and for the reverse driving of the engine and for the exhaust of the motive force, and means for changing the point of admission of the motive force.

25. A rotary engine comprising a casing and a relatively rotatable rotor mounted therein, and one or more nested tapered valves in the rotor for controlling the admission of motive agent into the casing and the exhaust of motive agent therefrom, and means for changing the point of admission of the motive force.

26. A rotary engine comprising a casing and a relatively rotatable rotor mounted therein, and nested means within the casing for controlling the admission of motive agent into the engine and for exhausting motive force therefrom at that side of the engine opposite the admission side.

27. A rotary engine comprising a casing and a relatively rotatable rotor mounted therein, means for admitting motive agent into the casing and for exhausting it therefrom, said rotor having circular flanged ends, and annular packing strips for said flanged ends presenting an acute angle at the meeting edges of the rotor and casing.

28. A rotary engine comprising a casing and a relatively rotatable rotor mounted therein, a tapered valve within the rotor for admitting motive agent into the casing, and a plurality of tapered sleeves between the valve and the rotor for varying the amount of motive agent admitted through said valve.

29. A rotary engine comprising a casing and a relatively rotatable rotor mounted therein and provided with a shaft, means for introducing a motive agent or agents into the casing through one end of the shaft, means for exhausting said agent or agents through the opposite end of said shaft, and means to change the point of exhaust for said agent or agents.

30. A rotary engine comprising a casing and a relatively rotatable rotor mounted therein, a tapered valve within the rotor for admitting motive agent into the casing, and a sleeve between the valve and the rotor for varying the amount of motive agent admitted through said valve and for reversing the engine, said valve and sleeve being circumferentially movable to change the point of admission of the motive agent.

31. A rotary engine comprising a casing and a relatively rotatable rotor mounted, therein and peripherally flanged at its ends, means for introducing a motive agent or agents into the casing, and means for exhausting a portion at least of said motive agent or agents through the rotor.

32. A rotary engine comprising a casing and a relatively rotatable rotor mounted therein, and one or more nested tapered valves, and a rotor for controlling the admission of motive agent into the casing and for exhausting the motive agent therefrom at the side opposite the admission of motive agent.

33. A rotary engine comprising a casing and a peripherally flanged rotatable rotor mounted therein, a packing or wearing strip or strips being provided at the meeting point of the inner face of said flange or flanges and the inside of said casing, said strip or strips being rotatable with the rotor.

34. A rotary engine comprising a casing and a peripherally flanged, relatively rotatable rotor mounted therein, and an expansible corner packing or wearing strip or strips mounted in said flanged portion or portions and positioned at the meeting point of the inner face of said flange or flanges and the inside of the casing, whereby said casing and flanged rotor meet at a packed right angle or right angles.

35. A rotary engine comprising a casing and a relatively rotatable, peripherally flanged rotor mounted therein, the flanged portion or portions of said rotor being provided with a plurality of laterally disposed packing or wearing strips, one of said strips being positioned at the meeting point of the inner face of said flange or flanges and the inside of the casing, whereby said casing and flanged rotor meet at a packed right angle or right angles.

36. A rotary engine comprising a casing and a relatively rotatable, peripherally flanged rotor mounted therein, the flanged portion or portions of said rotor being provided with one or more packing or wearing strips tapering in cross section, one of said strips packing the contacting edge of the flange of the rotor and said casing and carried by said rotor.

37. A rotary engine comprising a casing and a relatively rotatable, peripherally flanged rotor mounted therein, the peripherally flanged portion or portions of said rotor being provided with a peripheral recess or recesses for the reception of packing or wearing strips, and a packing or wearing strip or strips therein and carried by said rotor, said recesses being tapered in cross section.

38. A rotary engine comprising a casing and a relatively rotatable, peripherally flanged rotor mounted therein, said rotor having a pair of opposed concentric portions noncontacting with the casing and intermediate said portions a pair of casing contacting portions, the intermediate portions of said rotor merging gradually into the concentric and the casing contacting portions thereof.

39. A rotary engine comprising a casing, a relatively rotatable rotor mounted therein, an abutment or abutments mounted for movement toward and from the center of rotation of the rotor, means for introducing a motive agent or agents into the casing and means for introducing a portion thereof between the rotor contacting operative edges of said abutment or abutments.

40. A rotary engine comprising a casing and a relatively rotatable rotor mounted therein, an abutment or abutments mounted in the casing, and adapted to contact with the peripheral surface of said rotor, means for introducing a motive agent or agents into the casing, and means for introducing a portion thereof to that edge or edges of said abutment or abutments that contact with the rotor.

41. A rotary engine comprising a casing and a relatively rotatable rotor mounted therein, an abutment pivoted in the casing and having spaced edges adapted to contact with the peripheral surface of the rotor, and means for introducing a motive agent or agents between said spaced edges.

42. A rotary engine comprising a casing and a relatively rotatable rotor mounted therein, an abutment mounted for movement toward and from the center of rotation of the rotor and having spaced edges adapted to contact with the peripheral surface of the rotor, means for introducing a temperature regulating agent into said abutment or abutments, and means for discharging a portion of such temperature regulating agent between said spaced edges of said abutment.

43. A rotary engine comprising a casing and a relatively rotatable rotor mounted therein, an abutment having spaced edges to contact with the peripheral surface of the rotor, means for introducing a temperature regulating agent into the abutment, and means for discharging a portion of such temperature regulating agent between the said spaced edges thereof.

44. A rotary engine comprising a casing and a relatively rotatable rotor mounted therein, an abutment or abutments mounted to coöperate with the casing and the rotor, said abutment or abutments having a detachable wearing face, means for introducing a temperature regulating agent into the abutment or abutments, and means for discharging a portion of said temperature regulating agent to the rotor contacting edge of such detachable wearing face.

45. A rotary engine comprising a casing and a relatively rotatable rotor mounted therein, means for admitting motive force into the casing and for exhausting it therefrom, said rotor having circular flanged ends and annular packing strips in said flanged ends presenting an acute angle at the meeting edges of the rotor and casing.

46. A rotary engine comprising a casing, a shaft mounted within the casing and having a rotatable rotor thereon, said rotor having a plurality of opposed passages for admitting motive agent therethrough, and a plurality of opposed passages for exhausting motive agent therethrough, thereby to balance the rotor.

47. A rotary engine comprising a casing and a relatively rotatable rotor mounted therein, means for admitting motive force into the casing and for exhausting it therefrom, said rotor having circular flanged ends and annular packing strips received in said flanged ends of the rotor and presenting an acute angle at the meeting edges of the rotor.

48. A rotary engine comprising a casing and relatively rotatable rotor mounted therein, means for admitting motive force into the casing and for exhausting it therefrom, said rotor having circular flanged ends, annular packing strips for said flanged ends presenting an acute angle at the meeting edges of the rotor and casing, and connections between said annular packing strips.

49. A rotary engine comprising a casing and a peripherally flanged, rotatable rotor mounted therein and a packing or wearing strip presenting an acute angle at the meeting point of the inner face of said flange or flanges and the inside of the casing.

50. A rotary engine comprising in combination a casing, a relatively rotatable rotor mounted therein, an abutment having a rotor contacting face provided with a removable shoe and one or more packing strips at the head contacting end or ends of said abutment and having angled portions presenting a corner packing between the abutment, the rotor and the head, and engaging the face of said shoe.

51. A rotary engine comprising a casing, a shaft mounted therein carrying a rotor, means for introducing a motive agent through said shaft into the casing, a check valve or valves within said shaft controlling the admission of said motive agent, and means for introducing one or more additional motive agents into said shaft adjacent said check valve or valves.

52. A rotary engine comprising a casing, a rotatable rotor mounted therein, an abutment or abutments mounted in the casing and adapted to contact with the peripheral surface of said rotor, a cam mounted exteriorly of the casing and adapted to move said abutment or abutments in conformity with the movement of said rotor, said abutment or abutments having a member connected thereto and adapted to bear upon said cam, guiding means for said member, yielding connections between the cam and the abutment or abutments, and means to regulate the tension of said yielding means.

53. A rotary engine comprising a casing, a rotatable rotor mounted therein, a movable abutment or abutments adapted to contact with the peripheral surface of said rotor, a cam mounted exteriorly of the casing and adapted to move said abutment or abutments in conformity with the movement of said rotor, said abutment or abutments having a member adapted to engage said cam, guiding means for said members swingingly mounted exteriorly of the casing, yielding connections between the cam and the abutment or abutments, and means to regulate the tension of said yielding means.

54. A rotary engine comprising a casing, a rotatable rotor mounted therein, an abutment or abutments adapted to contact with the peripheral surface thereof, a cam mounted exteriorly of the casing and adapted to move the abutment or abutments in conformity with the movement of the rotor, said abutment or abutments having a member or members engaging said cam adapted thereby to be moved outwardly and thereby to move said abutment or abutments inwardly, yielding connections between the cam and the abutment or abutments, and means to regulate the tension of said yielding means.

55. A rotary engine comprising a casing and a relatively rotatable, peripherally flanged rotor mounted therein, corner packing or wearing strips mounted in said flanged portions, and means to prevent movement of said strips circumferentially of the rotor.

56. A rotary engine comprising a casing and a relatively rotatable, peripherally flanged rotor mounted therein, the flanged portions of said rotor being provided with circumferential grooves, corner packing or wearing strips mounted in said grooves and transverse members connecting said packing or wearing strips and preventing movement of said strips circumferentially of the rotor.

57. A rotary engine comprising a stationary cylinder, a rotor mounted therein and provided with a shaft, and a conical valve associated with said shaft and having means operatively connected with the moving parts of the engine and constructed and arranged to vary the time of the opening and the point of admission, thereby to admit a variable amount of the motive agent or agents to the engine.

58. A rotary engine comprising a stationary cylinder, a rotor mounted therein and provided with a shaft and a valve or valves associated with the shaft and having means operatively connected with the moving parts of the engine to vary the amount and time of opening thereof.

59. A rotary engine comprising among its elements, a shaft, a member mounted thereon and rotating therewith and a tapering valve associated with said shaft and having opposite variable admission ports, and means whereby said valve may be regulated to vary the amount and the time of opening.

60. A reversible rotary engine comprising among its elements a stationary cylinder, a rotor therein having a shaft, a member mounted thereon and rotating therewith, and a tapering valve or valves associated with said shaft and having means whereby the same may be regulated to admit a variable amount of the motive agent or agents to the engine for the direct driving and for the reverse driving thereof.

61. A reversible rotary engine comprising among its elements a stationary cylinder, a rotor therein having a shaft, a member mounted thereon and rotating therewith, and a tapered valve or valves associated with said shaft and having means whereby the same may be regulated to admit a variable amount of the motive agent or agents to the engine for the direct driving and for the reverse driving thereof.

62. A rotary engine comprising a casing, a shaft mounted therein, a rotor mounted upon said shaft to rotate therewith, means to admit a plurality of motive agents into said shaft and from thence into the rotor, and means to comminute or spray one or more of said motive agents within the shaft.

63. A rotary engine comprising a casing, a shaft mounted therein, a rotor mounted upon said shaft to rotate therewith, means to introduce a plurality of motive agents into said shaft and thence into the casing, and means to mix said plurality of said agents within the shaft and to spray or comminute one or more of said agents within the shaft.

64. A rotary engine comprising a casing, a relatively rotatable rotor mounted thereon and provided with a shaft, said rotor having opposite casing contacting portions, means for introducing a motive agent or agents into the casing through the shaft and rotor at the faces of said opposite rotor portions, and means for exhausting said agent or agents through said opposite rotor portions and said shaft.

65. A reversible rotary engine comprising a casing, a shaft mounted therein, a rotor mounted thereon and rotatable therewith, means to admit a motive agent or agents into said casing and to exhaust the same therefrom, an abutment or abutments mounted in said casing to contact with and having a pair of rotor contacting edges, one of which is in engagement therewith when the engine is operating in the forward direction and the other of which is in engagement therewith when the engine is operating in the reverse direction, and a heart shaped or double cam mounted radially beyond the rotor shaft and adapted to force one or the other of said abutment edges radially inward and to maintain the same in contact with the periphery of the rotor, the said cam when reversed in position being adapted to force the other abutment edge into contact with the periphery of the rotor and to maintain it in contact therewith.

66. A reversible rotary engine comprising a stationary casing and a rotatable rotor mounted therein, nested valves in the rotor for admitting motive fluid into the casing for the direct and for the reverse driving of the engine and constituting an adjustable port and means to change the point of admission of the motive force.

67. A rotary engine comprising a casing and a relatively rotatable rotor mounted therein, means for admitting a motive agent or agents into the casing and for exhausting the same therefrom, said rotor having flanged ends and ring like packing strips for said flanged ends movable with the rotor and presenting an acute angle at the meeting faces of the rotor and casing.

68. A reversible rotary engine comprising a casing and a relatively rotatable rotor mounted therein, a shaft whereon said rotor is mounted and nested means within said shaft for admitting a motive agent or agents into the casing for the direct and for the reverse driving of the engine and for the exhaust of the motive agent or agents through the side of the engine opposite the admission of the motive agent or agents.

69. A rotary engine comprising a casing and a relatively rotatable, peripherally flanged rotor mounted therein, the flanged portion or portions of the rotor being provided with one or more packing or wearing strips tapering in cross section, one of said strips packing the contacting edge of the flange of the rotor and the head.

70. A rotary engine comprising a casing and a relatively rotatable rotor mounted therein, means for admitting motive agent into the casing and for exhausting it therefrom, said rotor having a flanged end and a ring like packing strip for the flanged end, said casing, said rotor flanged end and said strip presenting a packed right angle.

71. A rotary engine comprising a casing and a relatively rotatable rotor mounted therein, means for admitting motive agent into the casing and for exhausting it therefrom, said rotor having a flanged end, and a ring like packing strip received in the flanged end of said rotor, said casing, said rotor flanged end and said strip presenting a packed right angle.

72. A rotary engine comprising in combination a casing, a relatively rotatable rotor mounted therein and an abutment movable toward and from the center of rotation of said rotor, there being a compression chamber between the rear of the abutment and the casing to overcome centrifugal action of the abutment and to force said abutment inward.

73. A rotary engine comprising in combination a casing, a relatively rotatable rotor mounted therein, an abutment movable toward and from the center of rotation of said rotor, there being a compression chamber between the rear of the abutment and the casing to overcome centrifugal action of the abutment and to force said abutment inward, and means to regulate the amount of compression in said chamber.

74. A rotary engine comprising a casing, a relatively rotatable rotor mounted therein, an abutment movable toward and from the center of rotation of said rotor and in the wall of said casing, there being a compression chamber between the rear of the abutment and the adjacent portion of the casing wall.

75. A rotary engine comprising a casing, a relatively rotatable rotor mounted therein, an abutment movable toward and from the center of rotation of said rotor and in the wall of said casing, there being a compression chamber between the rear of the abutment and the adjacent portion of the casing wall, and means to regulate the amount of compression in said chamber.

76. A rotary engine comprising a casing, a relatively rotatable rotor mounted therein, an abutment within the casing and movable toward and from the center of rotation of the rotor, a strip between the face of said abutment and the casing, and means to move said strip to maintain a tight fit.

77. A rotary engine comprising a casing, a relatively rotatable rotor mounted therein, and a packing strip in the casing effecting a tight fit between the contacting portions of the rotor and casing and presenting an acute angle thereto said packing strip being rotatable with the rotor.

78. A rotary engine comprising a casing, a relatively rotatable, flanged rotor mounted therein, a packing strip in the casing effecting a tight fit between the contacting portion of the flanged rotor and the casing, and means to maintain the strip against the flanged portion of the rotor, the flanged rotor, casing and strip presenting a flanged right angle.

79. A rotary engine comprising a casing, a relatively rotatable, flanged rotor mounted therein, a packing strip in the casing effecting a tight fit between the contacting portion of the flanged rotor and the casing, means to maintain the strip against the flanged portion of the rotor, and means wholly within the casing to prevent peripheral creep of said strip.

80. A rotary engine comprising a casing, heads therein, a relatively rotatable rotor mounted within said casing, and an expansion ring between the end of said casing and a head thereof, said expansion ring having an acute angled face.

81. A rotary engine comprising in combination a casing, a relatively rotatable rotor mounted therein and peripherally flanged, a ring-like packing strip in said flanged portion of the rotor, and a wedge piece between the ends of said packing strip positioned to wear in conformity with said rings and to present an outer face flush therewith.

82. A rotary engine comprising a casing and a relatively rotatable rotor mounted therein, said rotor having peripherally recessed opposite ends, packing rings in the recessed portions of said ends, connecting means between said packing rings, and means to prevent the upward movement of said packing rings from centrifugal force.

83. A reversible rotary engine comprising a casing and a relatively rotatable rotor mounted therein, one or more swinging abutments mounted for movement toward and from the center of rotation of the rotor, and means whereby a motive agent may be introduced through the rotor to either the forward face or the exhaust face of the abutment or abutments, and means to exhaust through the rotor.

84. A rotary engine comprising a casing, a rotatable rotor mounted therein and peripherally flanged at its opposite ends, a packing or wearing strip for each peripherally flanged portion of the rotor and presenting an acute angle at the meeting point of the inner face of the said flange and the inside of the casing, and connections between said pair of packing or wearing strips.

85. A rotary engine comprising among its elements, a shaft, a member mounted thereon and rotating therewith, and a valve associated with said shaft and having means whereby the same may be regulated to admit a variable amount of the motive agent or agents to the engine by varying the time of the opening.

86. A rotary engine comprising among its elements, a stationary cylinder, a rotor mounted therein and provided with a shaft, an abutment mounted in said cylinder and contacting with said rotor, and a conical valve associated with said shaft and having means whereby the same may be regulated to admit a variable amount of the motive agent or agents to the engine by varying the time of opening and point of admission.

87. A rotary engine comprising in combination, a stationary cylinder, a rotor mounted therein and provided with a shaft, an abutment mounted in said cylinder and contacting with said rotor and a valve associated with said shaft and having means whereby the same may be regulated to vary the amount and time of the opening.

88. A reversible rotary engine comprising among its elements, a stationary cylinder, a rotor therein having a shaft, an abutment mounted in a casing and contacting with said rotor, a member mounted upon said shaft, and rotating therewith, and a tapering valve or valves associated with said shaft and having means whereby the same may be regulated to admit a variable amount of the motive agent or agents to the engine for the direct driving and for the reverse driving thereof.

89. A rotary engine comprising a casing, a relatively rotatable rotor mounted therein and having flanged ends, a pair of packing strips in the casing effecting a tight joint between the contacting portions of the flanged rotor and the casing, means to maintain said strips against the flanged portions of the rotor, and a transverse connecting piece between said strips preventing peripheral creep of said strips.

In testimony whereof, I have signed my name to this specification in the presence of two subscribing witnesses.

WILLIAM NICHOLS MEARS.

Witnesses:
IRVING U. TOWNSEND,
EDWIN T. LUCE.